(12) United States Patent
Zhang et al.

(10) Patent No.: US 8,079,115 B2
(45) Date of Patent: Dec. 20, 2011

(54) AUTOMATICALLY OPENING HINGE ASSEMBLY FOR PORTABLE ELECTRONIC DEVICES

(75) Inventors: Yu Zhang, Shenzhen (CN); Guo-Zhao Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 501 days.

(21) Appl. No.: 12/334,650

(22) Filed: Dec. 15, 2008

(65) Prior Publication Data

US 2010/0050385 A1 Mar. 4, 2010

(30) Foreign Application Priority Data

Aug. 29, 2008 (CN) .......................... 2008 1 0304285

(51) Int. Cl.
*E05D 11/10* (2006.01)
(52) U.S. Cl. .................. 16/326; 16/316; 16/325; 16/327
(58) Field of Classification Search .............. 16/33, 277, 16/283–285, 290, 295, 300, 303, 305, 312, 16/316, 319, 325, 328, 324, 326
See application file for complete search history.

(56) References Cited

U.S. PATENT DOCUMENTS

| | | | |
|---|---|---|---|
| 5,109,571 A * | 5/1992 | Ohshima et al. | 16/307 |
| 5,628,089 A * | 5/1997 | Wilcox et al. | 16/303 |
| 6,070,298 A * | 6/2000 | Sorimachi | 16/330 |
| 6,952,860 B2 * | 10/2005 | Kawamoto | 16/285 |
| 7,007,345 B2 * | 3/2006 | Nakase et al. | 16/330 |
| 7,117,562 B2 * | 10/2006 | Zuo et al. | 16/303 |
| 7,140,071 B2 * | 11/2006 | Tonogai | 16/325 |
| 7,184,275 B2 * | 2/2007 | Yamaguchi et al. | 361/755 |
| 7,383,616 B2 * | 6/2008 | Duan et al. | 16/303 |
| 7,412,270 B2 * | 8/2008 | Takagi | 455/575.1 |
| 7,653,968 B2 * | 2/2010 | Kubota | 16/330 |
| 7,814,620 B2 * | 10/2010 | Lin et al. | 16/330 |
| 7,913,359 B2 * | 3/2011 | Duan et al. | 16/330 |
| 2004/0216275 A1 * | 11/2004 | Hayashi | 16/303 |
| 2005/0050683 A1 * | 3/2005 | Tonogai | 16/305 |
| 2006/0096064 A1 * | 5/2006 | Ma et al. | 16/303 |
| 2006/0174443 A1 * | 8/2006 | Takagi et al. | 16/330 |
| 2006/0242795 A1 * | 11/2006 | Duan et al. | 16/330 |

* cited by examiner

*Primary Examiner* — Victor Batson
*Assistant Examiner* — Roberta Delisle
(74) *Attorney, Agent, or Firm* — Altis Law Group, Inc.

(57) ABSTRACT

A hinge assembly (100) includes a cam (13), a follower (14), a first spring (12), a press rod (17), a control member (18) and a second spring (16). The cam has a cam surface. The follower has a latching cam surface engaging with the cam surface. The first spring provides an elastic force causing the cam surface of the cam and the latching cam surface of the follower to abut each other. The press rod includes a threaded portion (173). The control member threadedly engages with the threaded portion of the press rod. The second spring provides an elastic force to return the control member. When the press rod is pushed, the control member rotates to cause the follower to rotate whereby the cam surface of the cam rotates relative to the latching cam surface of the follower.

12 Claims, 7 Drawing Sheets

AUTOMATICALLY OPENING HINGE ASSEMBLY FOR PORTABLE ELECTRONIC DEVICES

BACKGROUND OF THE INVENTION

1. Field of the Invention

The present invention relates to hinge assemblies and, particularly, to an automatically opening hinge assembly for foldable devices such as portable telephones, portable computers, and so on.

2. Discussion of the Related Art

At present, one of the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a cam and a follower, which allows the cover section to fold outwards from the body section and then be held in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus allowing the concave portion to rotate about the convex portion. However, a user must typically open the mobile phone using both hands. This makes the mobile phone awkward to use in situations when the user has only one hand free.

Therefore, there is a room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

Figure 1:
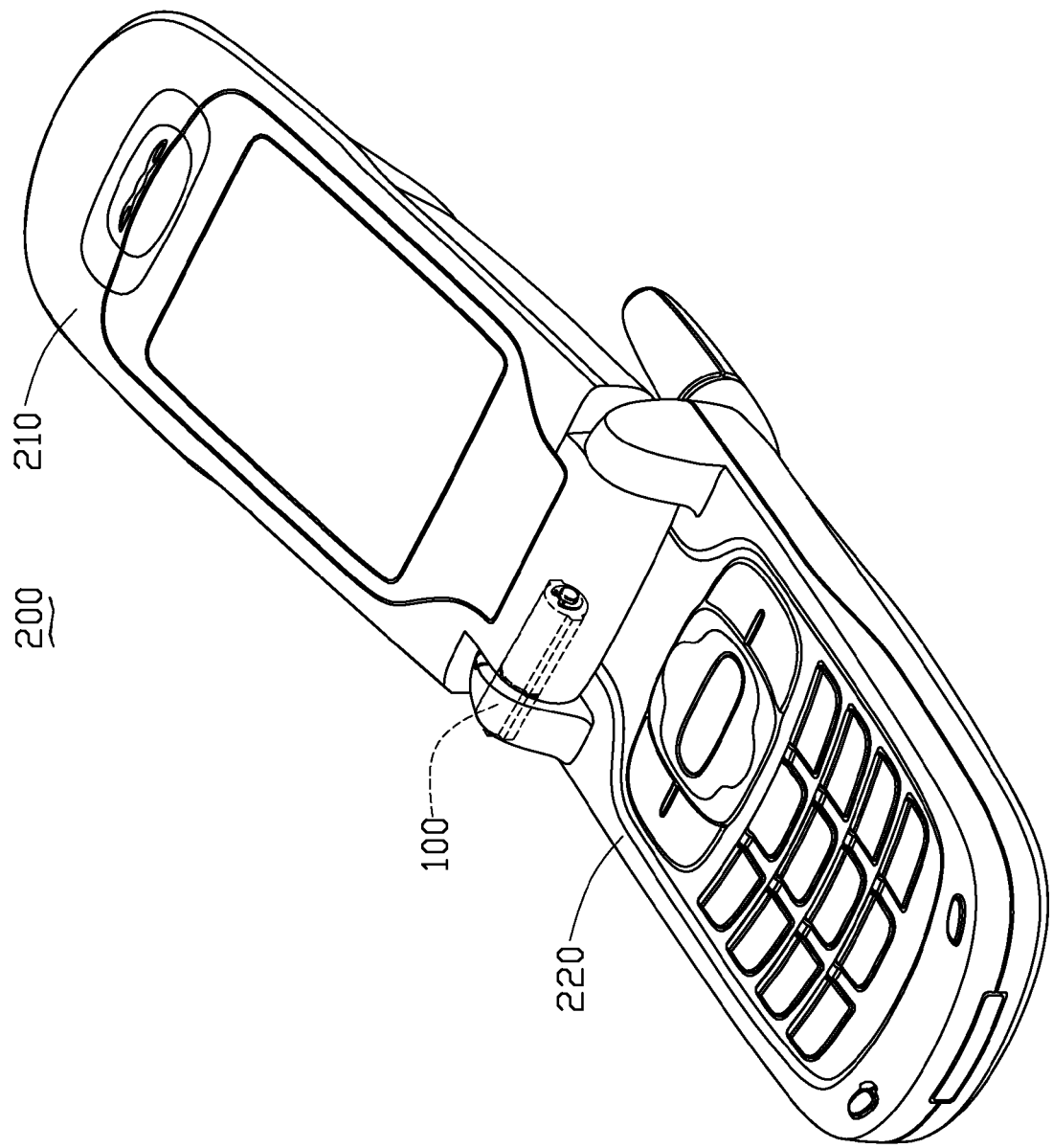
FIG. 1 is an isometric view of an exemplary embodiment of the present hinge assembly, as used in a mobile phone.

Referring now to the drawings in detail, FIG. 1 shows a hinge assembly 100, applied to a foldable electronic device 200 such as a flip type mobile phone, for pivotably coupling a cover section 210 and a body section 220. It is to be understood, however, that the hinge assembly 100 could be advantageously used in other environments (e.g. cabinet doors). As such, although proving particularly advantageous when used in foldable electronic devices, the hinge assembly 100 should not be considered limited in scope solely to foldable electronic devices.

Figure 2:
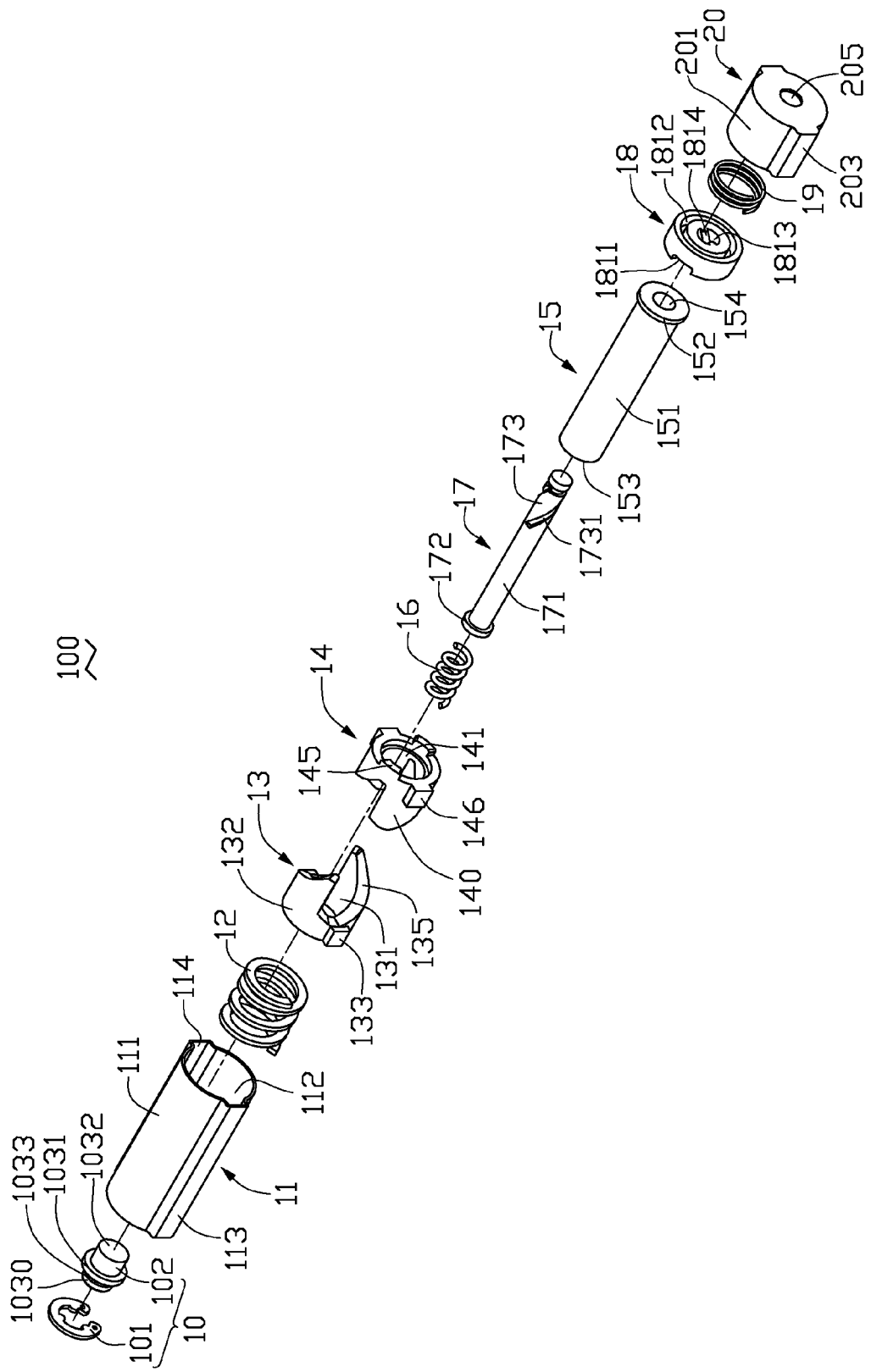
FIG. 2 is an exploded, isometric view of the exemplary embodiment of the hinge assembly shown in FIG. 1.
Figure 3:
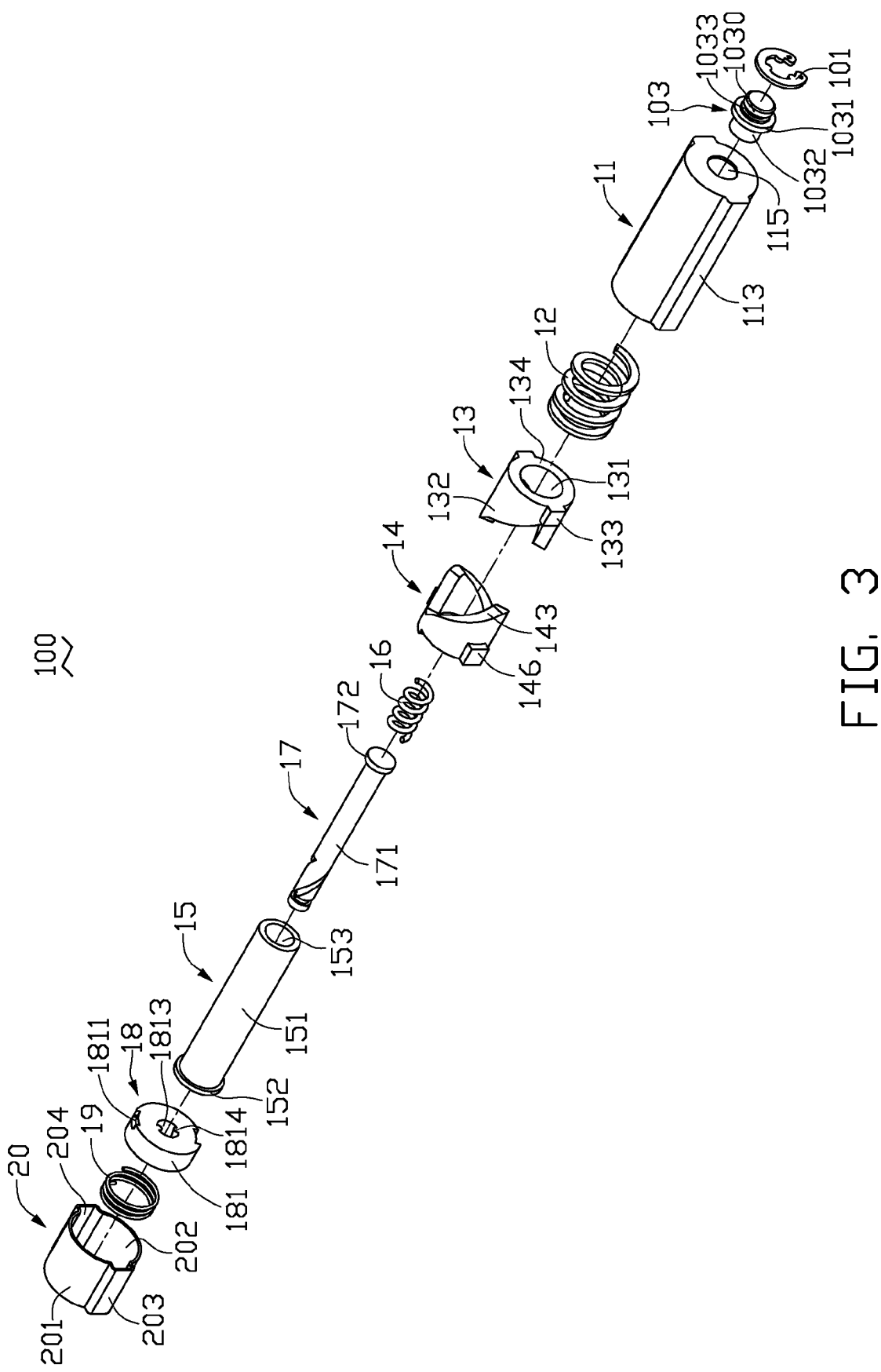
FIG. 3 is similar to FIG. 2, but viewed from another aspect.

Referring to FIGS. 2 and 3, the hinge assembly 100 in the embodiment illustrated includes a locking module 10, a first sleeve 11, a first spring 12, a cam 13, a follower 14, a barrel 15, a second spring 16, a press rod 17, a control member 18, a third spring 19 and a second sleeve 20.

The locking module 10 includes a washer 101 and a stopper 102. The washer 101 is substantially C-shaped. The stopper 103 is substantially cylindrical, and includes an extending end 1030 and a smooth end 1032. A ring rib 1031 is formed between the extending end 1030 and the smooth end 1032. The extending end 1030 defines a loop groove 1033 for locking with the washer 101.

The first sleeve 11 is a substantially hollow cylinder, and has an outer wall 111 and an inner wall 112. The inner wall 112 is recessed toward the outer wall 111 to form two symmetrical sleeve blocks 113. Correspondingly, two sleeve grooves 114 are defined in the inner wall 112. The sleeve blocks 113 of the sleeve 11 may engage with the cover section 210 of the mobile phone 200 so that the sleeve 11 and the cover section 210 cannot rotate relative to each other. The sleeve 11 includes an open end and a partially-closed end. The partially-closed end of the sleeve 11 defines a circular hole 115 at a central area thereof.

The first spring 12 is a cylindrical helical spring (i.e., occupying a cylindrical volume). An outer diameter of the first spring 12 is smaller than the diameter of the inner wall 112 of the sleeve 11 so that the first spring 12 may be received in the first sleeve 11.

Figure 4:
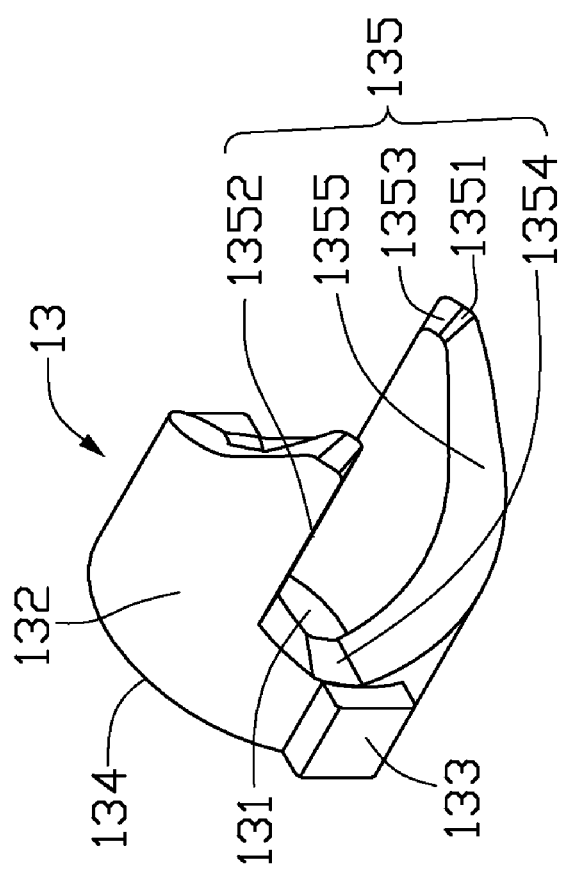
FIG. 4 is an enlarged view of the cam in FIG. 2.

Referring to FIG. 4, the cam 13 is substantially cylindrical, and has a peripheral wall 132. The diameter of the peripheral wall 132 matches the inner diameter of the first sleeve 11. The peripheral wall 132 forms two latching blocks 133 for engaging in the sleeve grooves 114 of the sleeve 11 so the cam 13 may be non-rotatably received in the first sleeve 11. The cam 13 defines a through hole 131. One end of the cam 13 has an end surface 134, and the other end of the cam 13 has a cam surface 135. The cam surface 135 includes two symmetrical peaks 1351, two vertical surfaces 1352, two connecting surfaces 1353, two symmetrical valleys 1354, and two sloped surfaces 1355 therebetween.

Figure 5:
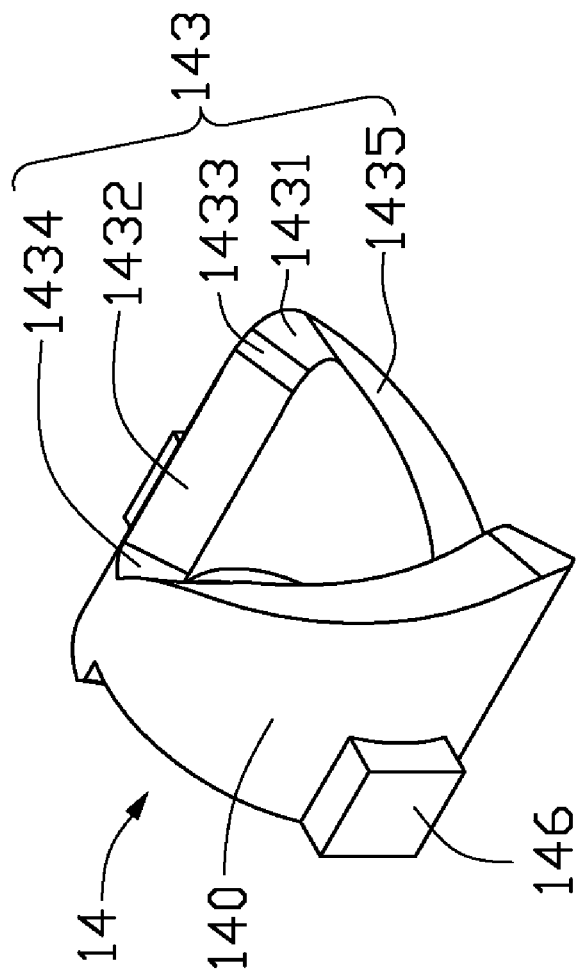
FIG. 5 is an enlarged view of the follower in FIG. 2.

Referring to FIG. 5, the follower 14 is substantially a cylinder, and includes a cylindrical circumferential wall 140. The circumferential wall 140 forms two engaging blocks 146. The follower 14 defines a through hole 141 therein. One end of the follower 14 has a latching cam surface 143, the other end thereof has two symmetrical thumb projections 145. The latching cam surface 143 includes two symmetrical peaks 1431, two symmetrical vertical surfaces 1432, two connecting surfaces 1433, two symmetrical valleys 1434, and two sloped surfaces 1435 for engaging with the cam surface 135 of the cam 13.

The barrel 15 is a hollow cylinder, and includes a barrel portion 151 and a fixing portion 152 formed at one end of the barrel portion. The barrel portion 151 defines a barrel hole 153 partially extending one part thereof. The fixing portion 152 defines a fixing hole 154 communicating with the barrel hole 153. A diameter of the barrel hole 153 is larger than the diameter of the fixing hole 154. The follower 14 is abuttingly engaged with the fixing portion 152 of the barrel 15.

The second spring 16 is substantially cylindrical. A diameter of the second spring 16 is substantially equal with the diameter of the barrel hole 153 so that the second spring 16 may be received in the barrel 15.

The press rod 17 includes a flange portion 172, a rod portion 171 and a threaded portion 173 integrally formed together. A diameter of the flange portion 172 is substantially equal with that of the barrel hole 153, and is larger than that of the fixing hole 154. The press rod 17 may be received in the barrel hole 153 and the fixing hole 154 of the barrel 15. The threaded portion 173 defines a single thread 1731, which is a recessed helical or spiral groove on the press rod 17.

The control member 18 is substantially disked-shaped, includes a body 181 defining a threaded hole 1813 surrounding by an inner circumferential wall. A single thread 1814 is defined in the inner circumferential wall of the threaded hole 1813, which is a raised helical or spiral rib/ridge on the inner circumferential wall of the control member 18. The threaded portion 173 of the press rod 17 may be received in the threaded hole 1813. One end of the body 181 forms two symmetrical slots 1811 at an outer peripheral along an axial thereof, the other end of the body forms an annular groove 1812.

The third spring 19 is substantially cylindrical. A diameter of the third spring 19 is slightly smaller than a diameter of the control member 18, and may be received in the annular groove 1812 of the control member 18.

The second sleeve 20 is substantially cylindrical, and includes an open end and a partially-closed end. The second sleeve 20 has an outer wall 201 and an inner wall 202. The inner wall 202 is recessed toward the outer wall 201 to form two symmetrical sleeve blocks 203. Correspondingly, two sleeve grooves 204 are defined in the inner wall 202. The sleeve blocks 203 of the second sleeve 20 may engage with the body section 220 of the mobile phone 200 so that the second sleeve 20 and the body section 220 cannot rotate relative to each other. The partially-closed end of the second sleeve 20 has a round hole 205.

Figure 6:
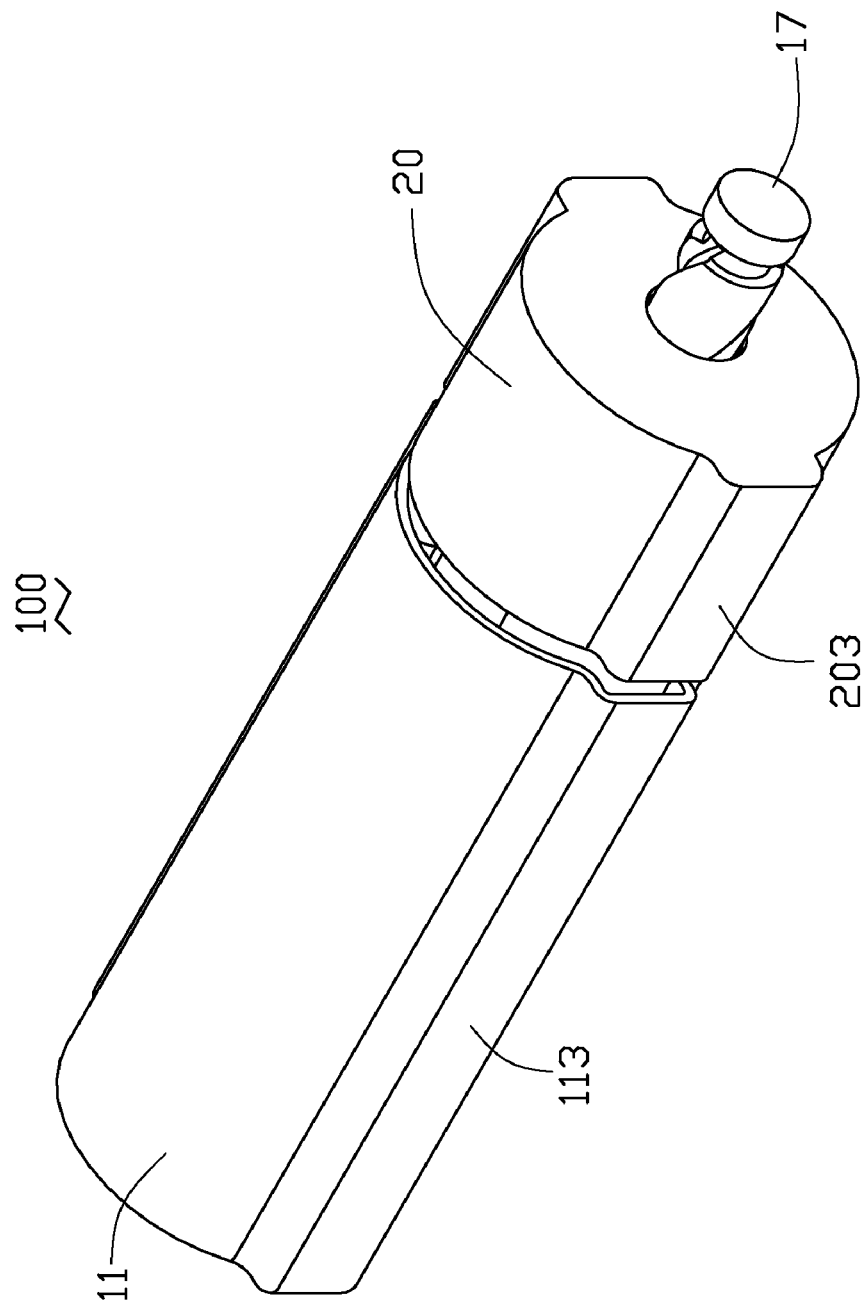
FIG. 6 is an assembled view showing the hinge assembly in FIG. 2.
Figure 7:
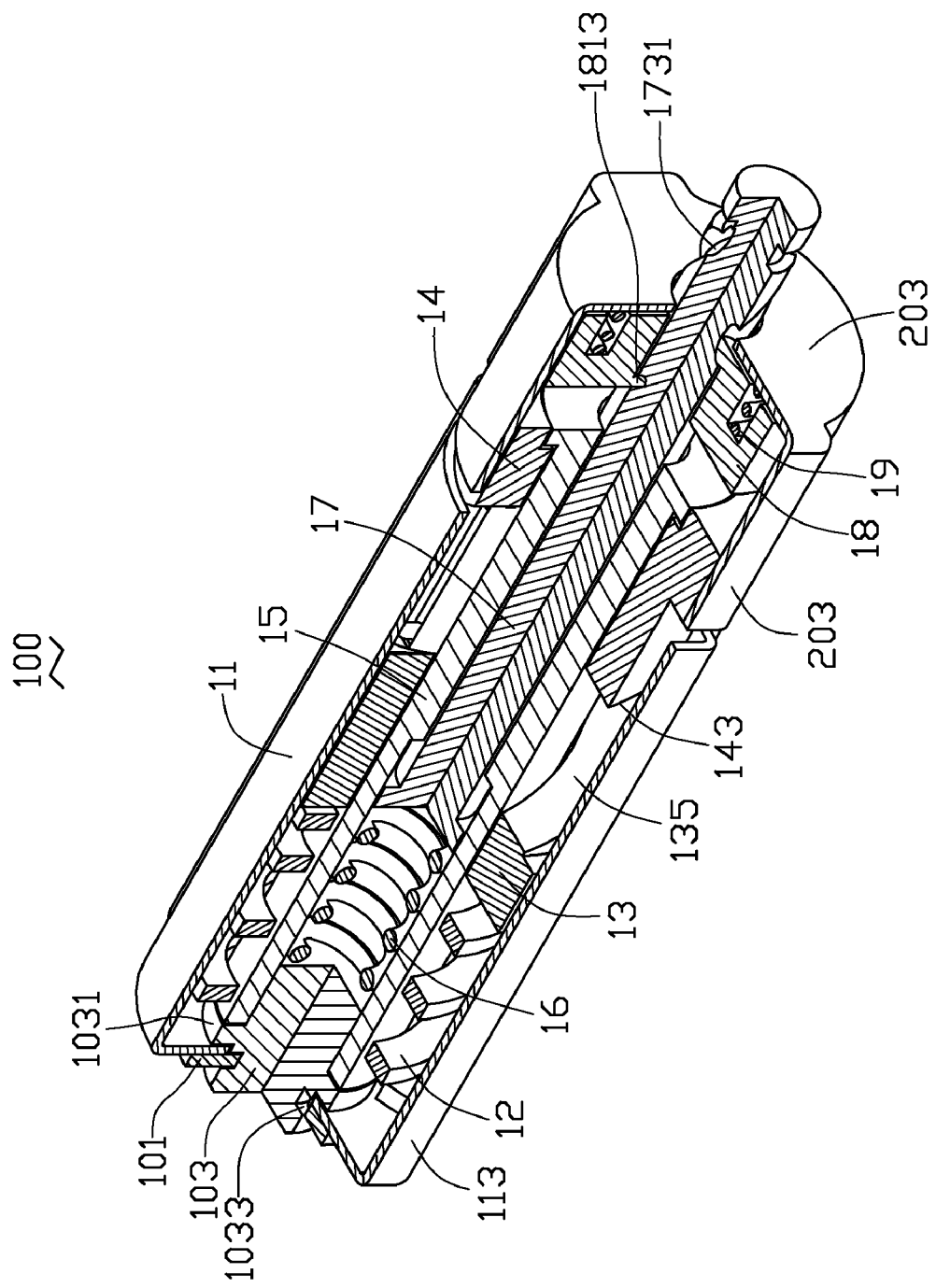
FIG. 7 is a cut-away view of FIG. 6.

In assembly, referring to FIGS. 6 to 7, one end of the barrel 15 firstly passes through the through hole 141 of the follower 14 to allow the fixing portion 152 to resist the follower 14. The cam 13 is placed around the barrel 15, with the cam surface 135 of the cam 13 engaging with the latching cam surface 143 of the follower 14. The press rod 17 is inserted into the barrel hole 153 and the fixing hole 154. The threaded portion 173 extends out from the fixing hole 154. After that, the control member 18 is placed around the threaded portion 173. The thread 1731 is engaged with the thread 1814. At the same time, the projections 145 of the follower 14 are received in the slots 1811 of the control member 18 resist. The second spring 16 is received in the barrel hole 153, and one end of the second spring 16 resists the flange portion 172 of the press rod 17.

After that, the smooth end 1032 of the stopper 103 presses the other end of the second spring 16 to lock in the barrel hole 153. Then, the third spring 19 is received in the annular groove 1812. The press rod 17 together with the above elements is received in the second sleeve 20, with one end of the third spring 19 resisting the partially end of the second sleeve 20. The threaded portion 173 is extended out from the round hole 205 of the second sleeve 20.

Finally, the first spring 12 is placed around the barrel 15 adjacent to the cam 13. The first sleeve 11 receives the first spring 12 and the cam 13. The latching blocks 133 are received in the sleeve groove 114 of the first sleeve 11. The first sleeve 11 is pushed to compress the first spring 12 until the stopper 103 is extended out from the circular hole 115. The washer 101 is locked in the loop groove 1033. Accordingly, the hinge assembly 100 is thus completely assembled.

If incorporated into a mobile phone during manufacture, the first sleeve 11 can engage in a cavity (not shown) of the cover section 210 of the mobile phone 200, and the second sleeve 20 can connect with the body section 220 of the mobile phone 200. When the cover section 210 of the mobile phone 200 is in a fully open position, the peaks 1351 of the cam surface 135 of the cam 13 abuts the valley 1434 of the latching cam surface 143. The first spring 12 exerts a predetermined pressure on the cam 13 and the follower 14. The second spring 16 exerts a predetermined pressure on the press rod 17. The third spring 19 exerts a predetermined pressure on the control member 18.

When the cover section 210 of the mobile phone 200 is being closed, the cover section 210 can be closed by hand by pushing the first sleeve 11 to rotate relative to the body section 220. The first sleeve 11 further brings the cam 13 to rotate relative to the follower 14. The follower 14 limited by the second sleeve 20 cannot rotate. When the cam 13 rotates, the follower 14 is pushed to only slide along an axial direction until the cam 13 passes over the peaks 1431 of the follower 14 to hold at the connecting surface 1433. At that time, the cover section 210 becomes closed relative to the body section 220 of the mobile phone 200.

When a user wants to automatically open the cover section 210 of the mobile phone 200 automatically, he/she may press the threaded portion 173 of the press rod 17 exposed from the second sleeve 11. In this process, the control member 18 cannot move axially and only rotate a small angle under the role of the third spring 19, and the follower 14 is caused to rotate a small angle until the cam surface 135 of the cam 13 then rotates relative to the latching cam surface 143 of the follower 14 under urging of the first spring 12. Furthermore, the cam 13 brings the first sleeve 11 to rotate so that the cover section 210 of the mobile phone 200 is opened. The cam 13 stops rotating when the cover section 210 of the mobile phone 200 is completely opened. Then, the press rod 17 is released. The elastic potential energy of the second spring 16 then pushes the press rod 17 to move toward the second sleeve 20, and the control member 18 reversely rotates along the threaded portion 173 until the control member 18 returns to an original position. The hinge assembly 100 may be opened manually.

In an alternative embodiment, the first spring 12, the second spring 16 and the third spring 19 may be replaced by other elastic elements such as an elastic sponge.

In an alternative embodiment, the configuration of the cam surface 135 of the cam 13 may be different from the latching cam surface 143 of the follower 14 as long as the cam surfaces 135 do not interfere with the latching cam surface 143 of the follower 14.

Understandably, the first sleeve 11 and the second sleeve 20 may be omitted. The number of the thread 1731 may be more than two. Correspondingly, the thread 1814 may be adjusted according to the number of the thread 1731.

As described above, the present invention provides a hinge assembly 100 for use with various portable devices, beyond the mobile phone illustrated, and/or with other devices needing a hinge assembly that facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A hinge assembly, comprising:
a cam having a cam surface;

a follower having a latching cam surface engaging with the cam surface;
a first spring providing an elastic force causing the cam surface of the cam and the latching cam surface of the follower to abut each other;
a barrel defining a barrel hole, the barrel extending through the cam, the follower and the first spring;
a press rod slidably received in the barrel hole of the barrel and including a threaded portion;
a control member threadedly engaging with the threaded portion of the press rod, and having one end engaging with the follower; and
a second spring providing an elastic force against the control member;
wherein when the press rod is pushed, the control member rotates along the threaded portion to cause the follower to rotate whereby the cam surface of the cam rotates relative to the latching cam surface of the follower.

2. The hinge assembly as claimed in claim 1, wherein the threaded portion defines a thread, the control member defines a threaded hole, and the thread is engaged in the threaded hole.

3. The hinge assembly as claimed in claim 1, wherein the follower forms at least one projection opposite to the latching cam surface, the control member forms at least one slot at one side thereof, and the at least one projection releasably received in a corresponding slot.

4. The hinge assembly as claimed in claim 3, further comprising a third spring, wherein the control member defines an annular groove at an opposite side thereof, and the third spring is received in the annular groove.

5. The hinge assembly as claimed in claim 1, wherein the second spring received in the barrel.

6. The hinge assembly as claimed in claim 1, further comprising a sleeve and a stopper, the sleeve defines a circular hole, the cam is non-rotatably connected with the sleeve, and the stopper is received in the circular hole.

7. A foldable electronic device having a body section and a cover section hinged together by a hinge assembly, the hinge assembly comprising:
a barrel defining a barrel hole;
a cam having a cam surface, the cam being fixed with respect to the cover section;
a follower having a latching cam surface engaging the cam surface;
a first spring biasing the cam surface of the cam against the latching cam surface of the follower, the barrel extending through the cam, the follower and the first spring;
a press rod received in the barrel hole of the barrel;
a control member threadly engaged with the press rod, and having one end engaging with the follower, the press rod causing the control member to rotate with the follower to cause the cam surface of the cam to rotate relative to the latching cam surface of the follower.

8. The foldable electronic device as claimed in claim 7, further comprising a third spring, wherein the control member defines an annular groove, and the third spring is received in the annular groove.

9. The foldable electronic device as claimed in claim 7, further comprising a sleeve and a stopper, the sleeve defines a circular hole, and the stopper is received in the circular hole.

10. The foldable electronic device as claimed in claim 7, wherein the follower forms at least one projection opposite to the latching cam surface, the control member forms at least one slot at one side thereof, and the at least one projection releasably received in a corresponding slot.

11. The foldable electronic device as claimed in claim 7, wherein the second spring and the press rod are received in the barrel.

12. The hinge assembly as claimed in claim 1, further comprising a first sleeve and a second sleeve, the cam is non-rotatably connected with the first sleeve, and the follower is non-rotatably connected with the second sleeve.

* * * * *